3,732,273
α-METHYLOL-BENZOIN-SULPHONIC
ACID ESTERS
Hans-Georg Heine, Krefeld, and Hans Rudolph and Hans-Joachim Kreuder, Krefeld-Bockum, Germany, assignors to Bayer Aktiengesellschaft, Leverkusen, Germany
No Drawing. Filed Apr. 1, 1970, Ser. No. 24,862
Claims priority, application Germany, Apr. 18, 1969,
P 19 19 678.2
Int. Cl. C07c 143/68
U.S. Cl. 260—456 R 8 Claims

ABSTRACT OF THE DISCLOSURE

The invention provides novel α-methylol-benzoin-sulphonic acid esters which may be manufactured by reacting equivalent amounts of an α-hydroxy-methylbenzoin and a sulphonic acid ester chloride in the presence of a hydrogen chloride binding agent. The novel compounds decompose on irradiation with UV light under liberation of the corresponding sulphonic acid. Therefore, they are suitable for use as curing catalysts which can be activated by UV-rays for acid-curable resins or resin compositions.

---

The subject of the invention are α-hydroxy-methylbenzoin-sulphonic acid esters of Formula I

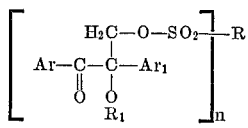

wherein

R denotes a lower alkyl radical containing up to about 4 carbon atoms, an alkylene radical containing up to about 6 carbon atoms, the phenyl, toluyl or naphthyl radical or divalent aromatic radical, $R_1$ denotes hydrogen or a lower alkyl radical containing up to about 4 carbon atoms, Ar and $Ar_1$ denote identical or different phenyl radicals unsubstituted or substituted by lower alkyl containing up to about 4 carbon atoms, lower alkoxy containing up to about 4 carbon atoms or halogen, and n denotes 1 or 2.

Examples of such esters are α-hydroxymethylbenzoin-methane-, -ethane-, -propane-, -isopropane-, -butane- and -isobutanesulphonic acid ester and the corresponding α-hydroxymethyl-4,4′-dimethyl-, -diethyl-, -dipropyl-, -di-isopropyl-, -dibutyl-, -diisobutyl-, -dimethoxy-, -diethoxy-, -dipropoxy-, -diisopropoxy-, -dibutoxy-, -diisobutoxy- and -dichlorobenzoinsulphonic acid ester, bis-(α-hydroxymethylbenzoin)-ethylene-, -propylene-, -isopropylene-, -butylene-, -isobutylene-, -pentylene-, -isopentylene-, -hexylene- and -isohexylene-disulphonate and the corresponding alkyl, alkoxy and halogen-substituted benzoin-derivatives, α-hydroxymethylbenzoin-benzene-, -p-toluene- and -β-naphthylene-sulphonic acid ester and the corresponding alkyl, alkoxy and halogen-substituted benzoin derivatives, α-hydroxymethylbenzoin-methyl-, -ethyl-, -propyl-, -isopropyl-, -butyl- and -isobutyl-ether-benzene sulphonic acid ester and the corresponding alkyl, alkoxy and halogen-substituted benzoin derivatives, and bis-(α-hydroxymethylbenzoin)-phenylene-, -diphenylene- and -diphenylmethane-disulphonate and the corresponding alkyl, alkoxy and halogen-substituted benzoin derivatives.

The new sulphonic acid esters are colourless crystalline substances which melt above 100° C. without decomposition and dissolve in many organic solvents.

They are distinguished by a particular property, namely that on irradiation with UV light they decompose to liberate the sulphonic acid. For this reason they are especially suitable for use as curing catalysts, which can be activated by UV-rays, for acid-curable resins or resin compositions. Such resins are for example phenolic resins and aminoplastics, especially urea and melamine resins, which are used on a large scale either as such, in a chemically modified form or as a mixture with resins of other kinds, for example nitrocellulose or alkyd resins, for example as lacquers, also as so-called photo-resist lacquers, and for textile coatings. The following may further be mentioned: acid-curing epoxy resins, methylol compounds and methylol ethers of polycarboxylic acid amides, for example polyacrylic and polymethacrylic acid amides, as well as alkyd resins containing urethane groups according to German displayed specification 1,270,719, and polymers which contain carbamic acid esters of N-methylolamides, for example again those derived from polyacrylic or polymethacrylic acid amides.

A subject of the invention is therefore furthermore the use of the new α-methylol-benzoin-sulphonic acid esters as an additive to acid-curing resins or resin compositions.

The amounts to be added are in general between about 0.1 and about 10 percent by weight, preferably between about 1 and 6 percent by weight, relative to the curable compositions.

They can in each case be used by themselves but also mixed with one another. The esters of aromatic sulphonic acids are preferred, since the advantageous properties are particularly pronounced in these.

Whilst the curable resins and resin compositions are not storage-stable after addition of the conventional acid curing agents, but instead already gel and cure after a short time, the particular advantage of the use of the new sulphonic acid esters as an additive to acid-curable resins and resin compositions consists of the fact that the resins and resin compositions are practically infinitely storable in the dark after the addition of the sulphonic acid esters but that the gelling and curing immediately starts on irradiation with light containing UV and then rapidly goes to completion.

The new sulphonic acid esters can be manufactured by reaction of n mols an α-hydroxymethylbenzoin of Formula II

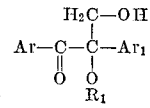

with at least 1 mol of a sulphonic acid chloride of Formula III

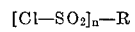

in the presence of an agent which binds hydrogen chloride, preferably a tertiary amine, and optionally of a solvent, at room temperature or moderately elevated temperature up to about 50° C.

Surprisingly, the sulphonic acid chloride here only reacts with the hydroxyl group of the hydroxymethyl group.

Triethylamine, lutidines, collidines, quinoline and pyridine can for example be used as agents which bind hydrogen chloride.

Suitable solvents which can optionally be conjointly used are for example benzene, toluene, xylene and ether.

The invention thus finally also relates to a process for the manufacture of the α-methylol-benzoin-sulphonic acid ester of the above Formula I by reaction of n mols of an α-hydroxymethylbenzoin of the above Formula II with at least 1 mol of a sulphonic acid chloride of the above Formula III in the presence of an agent which binds hydrogen chloride and optionally of a solvent.

Suitable α-hydroxymethylbenzoins are, for example: α-hydroxymethylbenzoin, α-hydroxymethyl-, -ethyl-, -propyl-, -isopropyl-, -butyl- and -isobutyl-ether and the corresponding methyl-, dimethyl-, ethyl-, diethyl-, propyl-, dipropyl-, isopropyl-, diisopropyl-, butyl-, dibutyl-, isobutyl-, diisobutyl-, chloro- and dichloro-substituted benzoins.

Suitable sulphonic acid chlorides are, for example: methane, ethane, propane, isopropane, butane and isobutane sulphonic acid chloride; ethylene, propylene, isopropylene, butylene, isobutylene, pentylene, isopentylene, and isohexylene bis-sulphonic acid chloride, benzene, p-toluene, β-naphthalene sulphonic acid chloride, phenylene, diphenylene and diphenylene-methane-bis-sulphonic acid chloride.

EXAMPLE 1

α-Hydroxymethylbenzoin-p-toluenesulphonic acid ester 121 g. (0.5 mol) of α-hydroxymethylbenzoin are dissolved in 120 ml. of pyridine with the addition of 60 ml. of benzene and are esterified with 105 g. (0.55 mol) of p-toluenesulphochloride. After 24 hours the reaction mixture is poured onto a mixture of ice and 2 N hydrochloric acid and worked-up. Melting point: 131.5–133° C. (methylene chloride/petroleum ether).

Yield: 89.5 g. (45% of theory) $C_{22}H_{20}O_5S$ (percent): (396) theoretical—C, 66.6; H, 5.05; O, 20.2; S, 8.07. Found (percent): C, 66.7; H, 4.90; O, 20.2; S, 8.10.

EXAMPLE 2

α-Hydroxymethylbenzoin-benzenesulphonic acid ester 121 g. (0.5 mol) of α-hydroxymethylbenzoin are esterified with 100 g. (0.56 mol) of benzenesulphochloride in 120 ml. of pyridine, with the addition of 60 ml. of benzene, in accordance with Example 1.

Melting point: 155–156° C. (methylene chloride).

Yield: 165.4 g. (91% of theory) $C_{21}H_{18}O_5S$ (percent): (382) theoretical—C, 66.0; H, 4.71; O, 20.9; S, 8.37. Found (percent): C, 65.8; H, 4.68; O, 21.0; S, 8.16.

EXAMPLE 3

α-Hydroxymethylbenzoin-methanesulphonic acid ester 121 g. (0.5 mol) of α-hydroxymethylbenzoin are esterified with 63 g. (0.55 mol) of methanesulphochloride in 48 g. (0.6 mol) of pyridine, with the addition of 300 ml. of benzene, in accordance with Example 1.

Melting point: 111–112° C. (ethanol).

Yield: 116 g. (72% of theory) $C_{16}H_{16}O_5S$ (percent): (320) theoretical—C, 60.0; H, 5.0; O, 25.0; S, 10.0. Found (percent): C, 60.0; H, 4.96; O, 25.2; S, 9.9.

EXAMPLE 4

α-Hydroxymethylbenzoin-β-naphthalenesulphonic acid ester 55.6 g. (0.23 mol) of α-hydroxymethylbenzoin are esterified with 82 g. (0.25 mol) of β-naphthalenesulphochloride in 60 ml. of pyridine, with the addition of 60 ml. of benzene, in accordance with Example 1.

Melting point: 121–123° C. (methylene chloride).

Yield: 88 g. (85% of theory) $C_{25}H_{20}O_5S$ (percent): (432.4) theoretical—C, 69.5; H, 4.66; O, 18.5; S, 7.4. Found (percent): C, 69.4; H, 4.78; O, 18.5; S, 7.3.

EXAMPLE 5

α-Hydroxymethyl-4,4′-dimethylbenzoinbenzenesulphonic acid ester 13.5 g. (0.05 mol) of α-hydroxymethyl-4,4′-dimethylbenzoin are esterified with 9.8 g. (0.055 mol) of benzenesulphochloride in 15 ml. of pyridine at 25° C. After the usual working-up, 20.4 g. of a yellow-coloured oil are obtained which is twice recrystallised from methylene chloride/petroleum ether.

Melting point: 121–123° C.

Yield: 16.1 g. (79% of theory) $C_{23}H_{22}O_5S$ (percent): (410.5) theoretical—C, 67.30; H, 5.40; O, 19.48; S, 7.81. Found (percent): C, 67.2; H, 5.33; O, 19.4; S, 7.70.

EXAMPLE 6

α-Hydroxymethyl-4,4′-dichlorobenzoinbenzenesulphonic acid ester 6.2 g. (0.02 mol) of α-hydroxymethyl-4,4″-dichlorobenzoin are esterified with 3.9 g. (0.022 mol) of benzenesulphochloride in 8 ml. of pyridine in accordance with Example 5.

Melting point: 134–135° C. (ether/petroleum ether).

Yield: 4.3 g. (47% of theory) $C_{21}H_{16}Cl_2O_5S$ (percent): (451.3) theoretical—C, 55.88; H, 3.57; Cl, 15.71; O, 17.72. Found (percent): C, 55.70; H, 3.52; Cl, 15.70; O, 18.40; S, 7.10, 7.01.

EXAMPLE 7

α-Hydroxymethylbenzoin-isopropyl-ether-benzenesulphonic acid ester 10.4 g. ($2.8 \times 10^{-2}$ mol) of α-hydroxymethybenzoin-isopropyl-ether are esterified with 5.3 g. ($3 \times 10^{-2}$ mol) of benzenesulphochloride in 12 ml. of pyridine in accordance with Example 1.

Melting point: 102–104° C. (ether/petroleum ether).

Yield: 8.3 g. (70% of theory) $C_{24}H_{24}O_5S$ (percent): (424) theoretical—C, 67.90; H, 5.70; O, 18.85; S, 7.55. Found (percent): C, 68.0; H, 5.67; O, 18.8; S, 7.56.

EXAMPLE 8

An acid-curable lacquer is compounded as follows:

60 parts by weight of a 60% strength solution of an alkyd resin in butanol (the alkyd resin was condensed by condensation of 90.2 parts by weight of caster oil, 128.4 parts by weight of soya oil, 95.1 parts by weight of trimethylolpropane, 76.3 parts by weight of pentaerythritol, 14.3 parts by weight of benzoic acid and 196.8 parts by weight of phthalic anhydride until an acid number of 8 and a hydroxyl number of 170 was reached), 40 parts by weight of a commercially available 60% strength solution of a urea-formaldehyde condensate in butanol, 7 parts by weight of ethylglycol, 7 parts by weight of butanol, 7 parts by weight of ethanol and 1 part by weight of a 1% strength silicone oil solution in xylene.

This lacquer is mixed with additives in accordance with the table. The resulting mixtures are applied to glass plates by means of a film spreader (100μ) and are then further treated in accordance with the table. The high pressure lamp employed for the irradiation is an instrument of Quartzlampengesellschaft mbH, Hanau (S 500) which acts on the coatings at a distance of 20 cm.

TABLE

| Initiator | Additive (parts by weight) relative to lacquer LF | Curing (minutes on exposure to— | | |
|---|---|---|---|---|
| | | Daylight | High pressure lamp | 2 minute high pressure lamp, then daylight |
| 1. p-Toluenesulphonic acid (15% strength) | 6.0 | 60 | | |
| 2. R*-methanesulphonate | 2.3 | >180 | 6.5 | 50 |
| 3. R*-benzenesulphonate | 2.2 | >180 | 8 | 50 |
| 4. R*-p-toluenesulphonate | 1.9 | >180 | 7.5 | 50 |

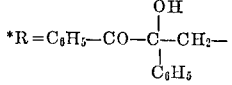

$$*R = C_6H_5-CO-\underset{\underset{C_6H_5}{|}}{\overset{\overset{OH}{|}}{C}}-CH_2-$$

Whilst the mix containing p-toluenesulphonic acid gels after a few minutes and can then no longer be processed, the mixes according to the invention are storage-stable for any desired length of time if light is excluded.

If they are only cured according to the table after 5 months' storage in the dark at room temperature, the same reaction course results.

What we claim is:

1. α-Hydroxymethyl-benzoin-sulphonic acid esters of the formula:

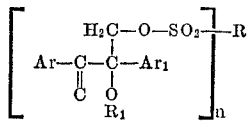

wherein
R is a lower alkyl radical containing up to 4 carbon atoms, an alkylene radical containing up to 6 carbon atoms, the phenyl, toluyl or naphthyl radical,
$R_1$ is hydrogen or a lower alkyl radical containing up to 4 carbon atoms,
Ar and $Ar_1$ denote identical or different phenyl radicals unsubstituted or substituted by lower alkyl containing up to 4 carbon atoms, lower alkoxy containing up to 4 carbon atoms or halogen, and $n$ is 1 or 2.

2. α - Hydroxymethyl-benzoin-methane-sulphonic acid ester.

3. α - Hydroxymethyl-benzoin-benzene-sulphonic acid ester.

4. α-Hydroxymethyl-benzoin-p-toluene-sulphonic acid ester.

5. α - Hydroxymethyl-benzoin-β-naphthalene-sulphonic acid ester.

6. α-Hydroxymethyl - 4,4' - dimethylbenzoin-benzene-sulphonic acid ester.

7. α-Hydroxymethyl - 4,4' - dichlorobenzoin-benzene-sulphonic acid ester.

8. α - Hydroxymethyl-benzoin-isopropyl-ether-benzene-sulphonic acid ester.

References Cited

UNITED STATES PATENTS

| | | | |
|---|---|---|---|
| 2,694,699 | 11/1954 | Loaska et al. | 260—456 R |
| 3,462,473 | 8/1969 | Nelson et al. | 260—456 P |

OTHER REFERENCES

Roberts and Caserio "Basic Principles of Org. Chem.," p. 762 (N.Y. 1964).

Chemische Berichte, pp. 656–664, Z. Foldi (esp. p. 664) (1927).

BERNARD HELFIN, Primary Examiner

L. B. DE CRESCENTE, Assistant Examiner

U.S. Cl. X.R.

117—93.31; 260—2 EP, 9 R, 13, 51, 51.5 R, 75 R, 77.5 R, 79.3 R, 80 C, 89.7 R, 456 P